(12) United States Patent
Yagisawa et al.

(10) Patent No.: US 9,191,122 B2
(45) Date of Patent: Nov. 17, 2015

(54) OPTICAL MODULE WITH A LIGHT RECEIVING ELEMENT RECEIVING LEAKAGE LIGHT AND METHOD OF MONITORING OPTICAL MODULE BY RECEIVING LEAKAGE LIGHT

(71) Applicant: FUJITSU LIMITED, Kawasaki-shi, Kanagawa (JP)

(72) Inventors: Takatoshi Yagisawa, Kawasaki (JP); Takashi Shiraishi, Isehara (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/079,884

(22) Filed: Nov. 14, 2013

(65) Prior Publication Data

US 2014/0199064 A1  Jul. 17, 2014

(30) Foreign Application Priority Data

Jan. 16, 2013  (JP) ................................ 2013-005301

(51) Int. Cl.
   *G02B 6/42* (2006.01)
   *H04B 10/60* (2013.01)
   *H04B 10/071* (2013.01)

(52) U.S. Cl.
   CPC .............. *H04B 10/60* (2013.01); *G02B 6/4286* (2013.01); *H04B 10/071* (2013.01); *G02B 6/4214* (2013.01)

(58) Field of Classification Search
   CPC .. G02B 6/4214; G02B 6/29361; H04B 10/60; H04B 10/071
   USPC .......................................................... 385/14
   See application file for complete search history.

(56) References Cited

U.S. PATENT DOCUMENTS

| | | | |
|---|---|---|---|
| 5,751,748 A | 5/1998 | Uejima et al. | |
| 6,205,274 B1* | 3/2001 | Zhou | 385/38 |
| 2003/0169979 A1* | 9/2003 | Fujita et al. | 385/89 |
| 2012/0076454 A1 | 3/2012 | Shiraishi | |
| 2012/0263416 A1 | 10/2012 | Morioka | |

FOREIGN PATENT DOCUMENTS

| | | |
|---|---|---|
| JP | 8-330661 | 12/1996 |
| JP | 2011-141478 | 7/2011 |
| JP | 2012-68539 | 4/2012 |

OTHER PUBLICATIONS

Fujime et al, "Construction of a Computer-Assisted Multichannel Lock-in Detector", Japanese Journal of Applied Physics. vol. 19, No. 11, Nov. 5, 1980, pp. 2239-2244. XP-055115460.
Extended European Search report dated May 20, 2014 in European Patent Application No. 13193845.8-1562.

* cited by examiner

*Primary Examiner* — Akm Enayet Ullah
(74) *Attorney, Agent, or Firm* — Staas & Halsey LLP

(57) ABSTRACT

An optical module include a first substrate including a first surface over which a light emitting element is mounted, an optical waveguide provided with a second surface of the first substrate, a mirror configured to reflect output light of the light emitting element to the optical waveguide, a second substrate, and a light receiving element configured to receive leakage light produced when the output light from the light emitting element is transmitted through the mirror disposed in the optical waveguide, the light receiving element being mounted over the second substrate different from the first substrate.

7 Claims, 9 Drawing Sheets

OPTICAL MODULE WITH A LIGHT RECEIVING ELEMENT RECEIVING LEAKAGE LIGHT AND METHOD OF MONITORING OPTICAL MODULE BY RECEIVING LEAKAGE LIGHT

CROSS-REFERENCE TO RELATED APPLICATION

This application is based upon and claims the benefit of priority from the prior Japanese Patent Application No. 2013-005301 filed on Jan. 16, 2013, the entire contents of which are incorporated herein by reference.

FIELD

The embodiments discussed herein are related to an optical module and a method of monitoring an optical module.

BACKGROUND

Japanese Laid-open Patent Publication No. 2011-141478 has disclosed a structure of a multi-channel optical transmitter in which a signal light condensed by a lens is branched, and is monitored by a monitoring PD for each channel.

However, in the technique in Japanese Laid-open Patent Publication No. 2011-141478, a light emitting element and a light receiving element are provided with a same substrate, and thus the output wire lines of the light receiving element have to be provided with that substrate. In this case, the thickness of an optical transmitter increases, and the device becomes large in size.

SUMMARY

According to an aspect of the embodiment, an optical module include a first substrate including a first surface over which a light emitting element is mounted, an optical waveguide provided with a second surface of the first substrate, a mirror configured to reflect output light of the light emitting element to the optical waveguide, a second substrate, and a light receiving element configured to receive leakage light produced when the output light from the light emitting element is transmitted through the mirror disposed in the optical waveguide, the light receiving element being mounted over the second substrate different from the first substrate.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In the following, a description will be given of embodiments with reference to the drawings.

Figure 1:
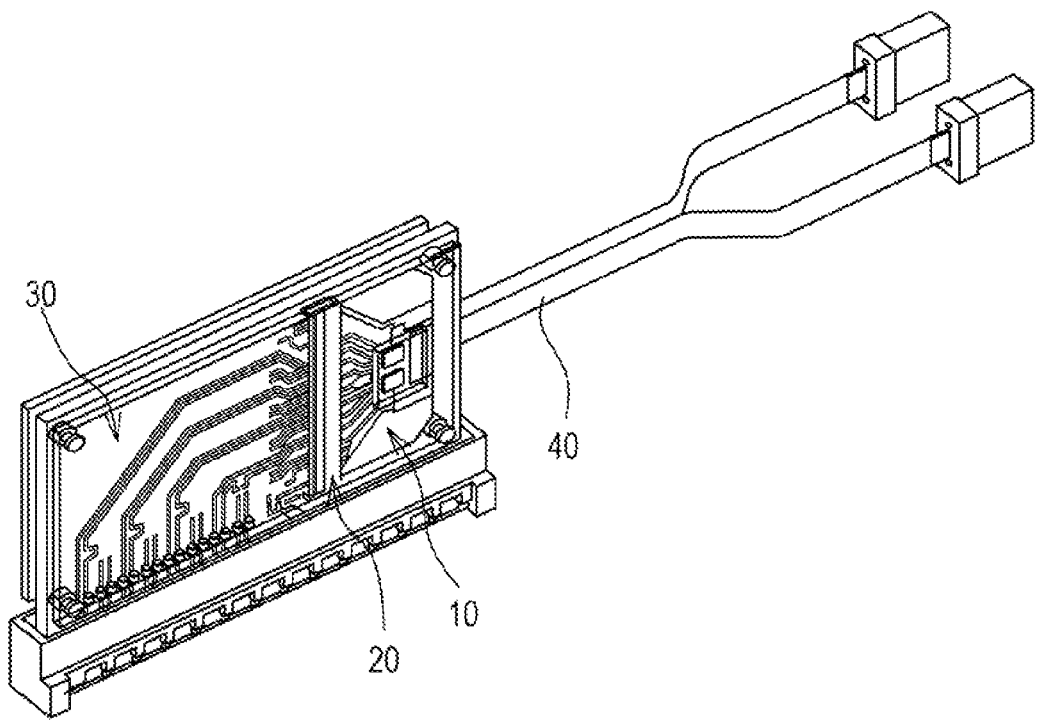
FIG. 1 is an outer perspective view of an optical module according to a first embodiment.

FIG. 1 is an outer perspective view of an optical module 100 according to a first embodiment. The optical module 100 is an optical transmitter and receiver. However, in the following, for simplification, a description will be mainly given of a function of a transmitter. Referring to FIG. 1, the optical module 100 includes an optical transmitter 10, an electrical connector 20, an optical module substrate 30, a transmission line 40, and so on. The optical transmitter 10 is a sheet-like transmitter (flexible printed circuit optical engine (FPC-OE)), for example. The optical module substrate 30 is a substrate over which electric wiring lines, and so on are disposed, and functions as an interface with an external device. The optical transmitter 10 is fixed on the optical module substrate 30 through the electrical connector 20. The optical transmitter 10 receives an electronic signal from the optical module substrate 30 through the electrical connector 20, and the optical transmitter 10 transmits an optical signal through the optical waveguide 40.

Figure 2A:
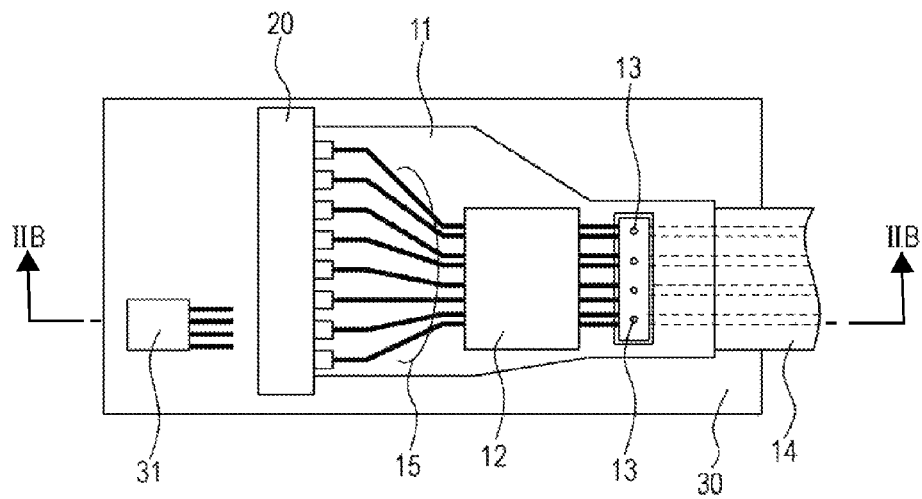
FIG. 2A is a top view of the optical module.
Figure 2B:
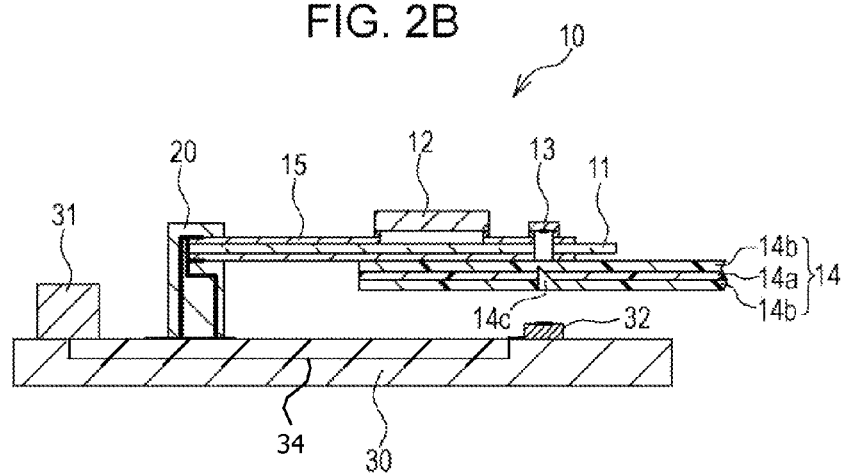
FIG. 2B is a sectional view taken on line IIB-IIB in FIG. 2A.

Next, a description will be given of the details of the optical module 100. FIG. 2A is a top view of the optical module 100. FIG. 2B is a sectional view taken on line IIB-IIB in FIG. 2A. Referring to FIG. 2A and FIG. 2B, a control unit 31, light receiving elements 32, and so on are provided with the main surface of the optical module substrate 30. The control unit 31 and the light receiving elements 32 are connected through electric wiring lines 34. The electrical connector 20 is provided with the main surface of the optical module substrate 30, and is connected to the control unit 31 through electric wiring lines 34. The optical transmitter 10 is fixed to the electrical connector 20 so as to be opposed to the optical module substrate 30. In this regard, the optical transmitter 10 may be disposed over the optical module substrate 30 with a predetermined distance away with each other.

The optical transmitter 10 includes a circuit substrate 11, a drive circuit 12, a light emitting element 13, an optical waveguide 14, and so on. In the present embodiment, the optical transmitter 10 supports four channels as one example. Thus, the optical transmitter 10 is provided with four light emitting elements 13. The drive circuit 12 and the individual light emitting elements 13 are provided with a first surface of the circuit substrate 11. The first surface of the circuit substrate 11 is an opposite side surface to the optical module substrate 30. The optical waveguide 14 is provided with a second surface of the circuit substrate 11. The second surface of the circuit substrate 11 is a surface of the side of the optical module substrate 30.

The circuit substrate 11 is, for example, a flexible printed circuit substrate (FPC) having flexibility, and wiring conductors are patterned on the first surface thereof. For the circuit substrate 11, a thin and transparent material having a little electronic signal loss at the higher frequencies is used. For example, it is possible to use polyimide, and so on for the circuit substrate 11. A pair of differential electronic signal lines 15 are provided with the first surface of the circuit substrate 11 for each channel. In the present embodiment, eight electronic signal lines 15 are disposed for four channels. One end of these electronic signal lines 15 is connected to an external device through the electrical connector 20, and the other end is connected to each of the light emitting elements 13 through the drive circuit 12. The drive circuit 12 drives each of the light emitting elements 13 in accordance with the main signals of the channels 1 to 4 that are transmitted from an external device.

The light emitting element 13 is a light source, such as a semiconductor laser, and so on. For the light emitting element 13, it is possible to use a vertical cavity semiconductor emission laser (VCSEL), for example. The output light of the light emitting element 13 is transmitted through the circuit substrate 11 in the thickness direction thereof, and enters into the optical waveguide 14. In this regard, a hole may be formed on the circuit substrate 11 in the light path through which the output light of the light emitting element 13 passes. Also, a lens, and so on may be disposed at a place through which the output light of the light emitting element 13 passes.

The optical waveguide 14 is a polymer optical waveguide made of, for example, epoxy resin, acrylate resin, or the like. For example, the optical waveguide 14 includes a core 14a in the center section, and a clad 14b having a lower refraction factor than the core 14a and disposed around the core 14a. With this configuration, a signal light in the core 14a is transmitted while being subjected to total reflection at the boundary face of the core 14a and the clad 14b. Four pieces of the cores 14a are disposed correspondingly to the channels of the optical transmitter 10.

A mirror 14c is disposed at the place where output light of each light emitting element 13 enters into the optical waveguide 14. The mirror 14c is an optical axis change unit for optically coupling the output light of each light emitting element 13 to the core 14a. The mirror 14c is formed by cutting the optical waveguide 14 by, for example, dicing, laser processing, and so on. The gradient angle of mirror 14c is 45 degrees, for example. Thereby, the mirror 14c reflects the output light of each light emitting element 13 to each core 14a.

Four light receiving elements 32 are disposed correspondingly to the channels of the optical transmitter 10. Each light receiving element 32 is disposed in an opposed manner to each light emitting element 13 through the circuit substrate 11 and the optical waveguide 14. Thereby, it is possible for each light receiving element 32 to receive leakage light of the mirror 14c. Each light receiving element 32 transmits an electronic signal obtained by photoelectric conversion to the control unit 31.

Figure 3:
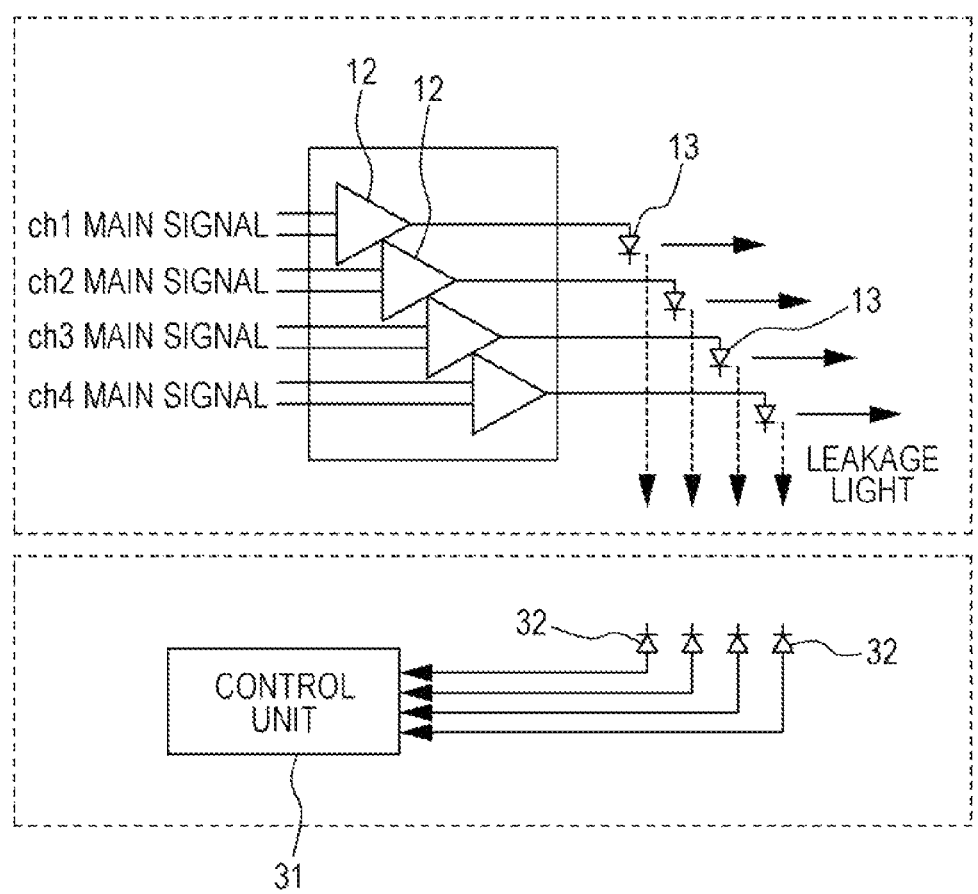
FIG. 3 is a diagram illustrating flows of an electronic signal and an optical signal.

FIG. 3 is a diagram illustrating flows of an electronic signal and an optical signal. Referring to FIG. 3, the drive circuit 12 transmits a drive signal to each light emitting element 13 in accordance with each of the main signals of the channels 1 to 4, which is transmitted from the external device. Each light emitting element 13 outputs an optical signal in accordance with the drive signal from the drive circuit 12. The optical signal output by each light emitting element 13 is reflected by the mirror 14c, and enters the optical waveguide 14. The leakage light of the mirror 14c is received by each light receiving element 32. Each light receiving element 32 transmits the electronic signal obtained by photoelectric conversion to the control unit 31. After going through the above processes, it is possible to monitor an optical signal (for example, optical output power) for each channel.

Figure 4A:
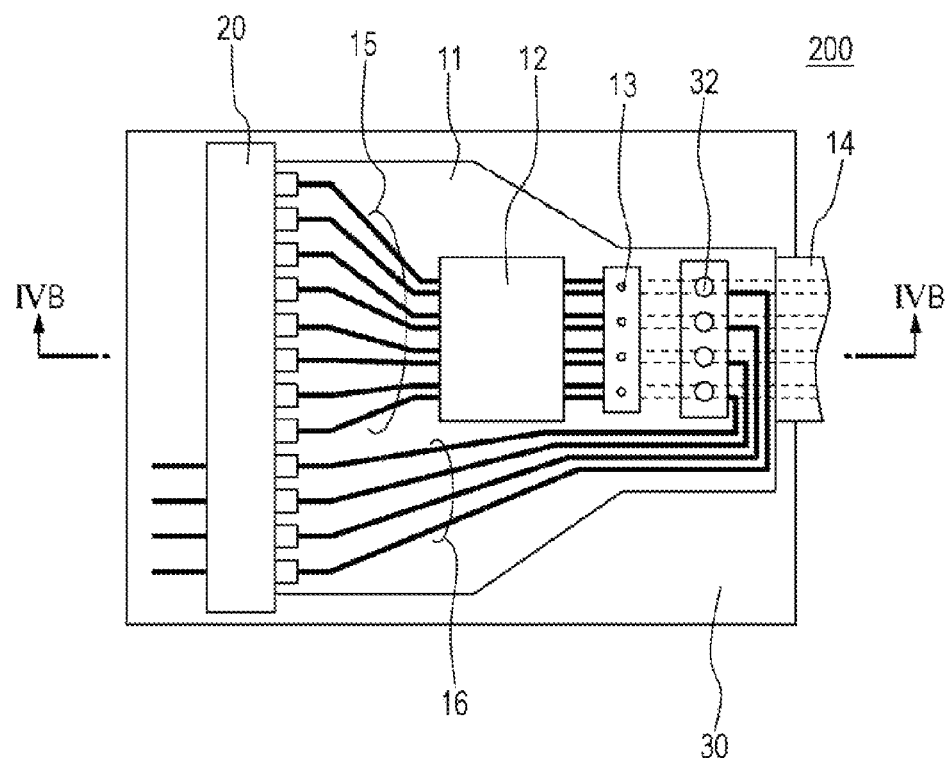
FIG. 4A is a top view of an optical module according to a comparative example.
Figure 4B:
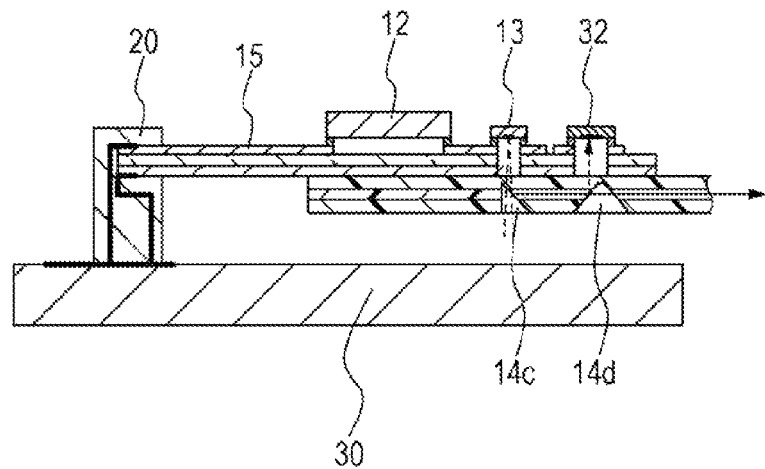
FIG. 4B is a sectional view taken on line IVB-IVB in FIG. 4A.

Here, in order to explain advantages of the optical module 100, a description will be given of a comparative example. FIG. 4A is a top view of an optical module 200 according to the comparative example. FIG. 4B is a sectional view taken on line IVB-IVB in FIG. 4A. Referring to FIG. 4A and FIG. 4B, in the optical module 200, a mirror 14d for reflecting part of an optical signal to a circuit substrate 11 side is disposed in the middle of the optical waveguide 14. The light reflected by the mirror 14d is transmitted in the thickness direction of the circuit substrate 11. Each light receiving element 32 is provided with a first surface of the circuit substrate 11 so as to receive the reflected light of the mirror 14d. In this manner, both each light emitting element 13 and each light receiving element 32 are provided with the first surface of the circuit substrate 11.

In the optical module 200, each light receiving element 32 is provided with the first surface of the circuit substrate 11, and thus output wire lines 16, through which an electronic signal output by each light receiving element 32 passes, go through on the first surface of the circuit substrate 11, and are connected to an optical module substrate 30 through an electrical connector 20. In such a configuration, both electronic signal lines 15 and output wire lines 16 are provided with the first surface of the circuit substrate 11, and thus the number of electrical connectors 20 becomes large. Accordingly, the width of the circuit substrate 11 becomes large. Also, leakage light occurs on the mirror 14c, and further part of the optical signal is branched by the mirror 14d, and thus optical signal power transmitted from the optical transmitter 10 becomes small.

In contrast, in the first embodiment, each light receiving element 32 is provided with the optical module substrate 30, and thus it is possible to transmit the output light of the light emitting element 13 to the optical module substrate 30 without conversion into an electronic signal. In this case, output wire lines for the light receiving elements 32 do not have to be provided with the circuit substrate 11, and thus it is possible to reduce the number of pins of the electrical connector 20. Thereby, it is possible to decrease the width of the circuit substrate 11. As a result, it becomes possible to miniaturize the optical module 100. Also, in the first embodiment, it is possible to use leakage light at the mirror 14c for monitoring, and thus a branch for monitoring as in the comparative example becomes useless. Thereby, it is possible to suppress a decrease in power of the optical signal transmitted from the optical transmitter 10. In this regard, in the present embodiment, the circuit substrate 11 functions as a first substrate including the first surface over which the light emitting element 13 is mounted, and a second surface over which the optical waveguide 14 is disposed. Also, the optical module substrate 30 functions as a second substrate over which the light receiving elements 32 receiving the leakage light of the mirror 14c is mounted.

Figure 5A:
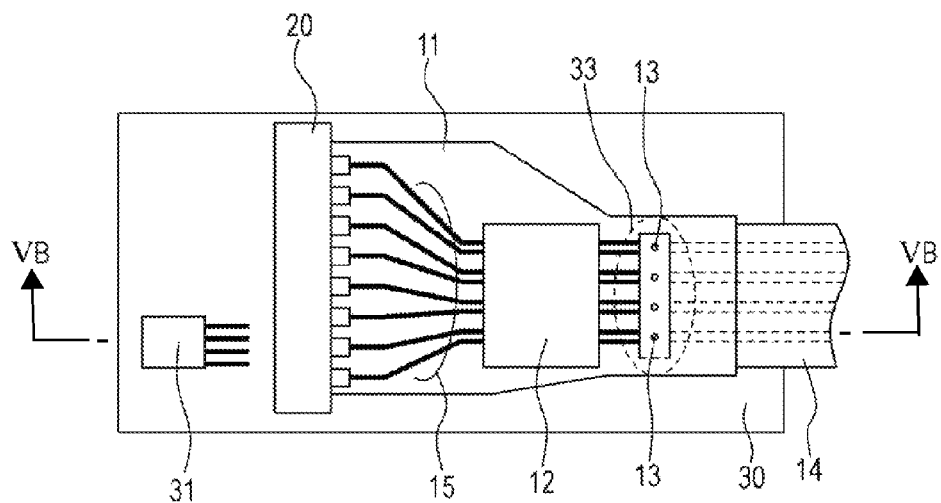
FIG. 5A is a top view of an optical module according to a second embodiment.
Figure 5B:
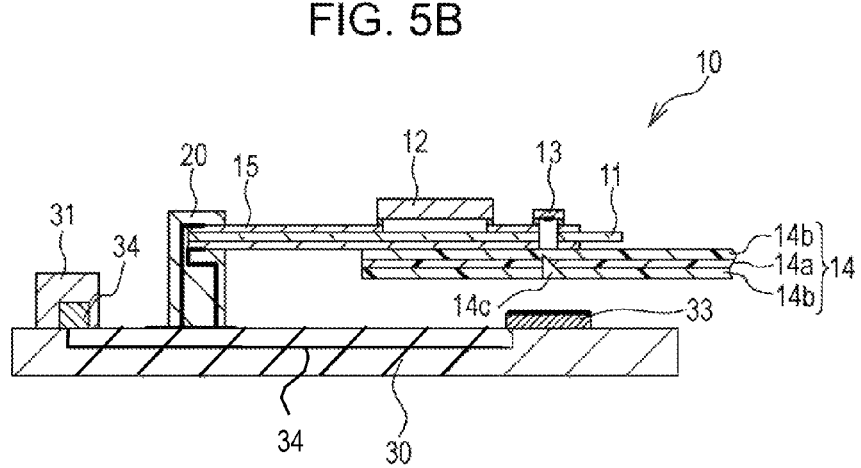
FIG. 5B is a sectional view taken on line VB-VB in FIG. 5A.

In the first embodiment, a light receiving element is disposed for each channel. However, the present disclosure is not limited to this. For example, one light receiving element may be disposed in common for a plurality of channels. FIG. 5A is a top view of an optical module 100a according to a second embodiment, and FIG. 5B is a sectional view taken on line VB-VB in FIG. 5A. Referring to FIG. 5A and FIG. 5B, in the optical module 100a, one light receiving element 33 is disposed for a plurality of channels. In the example in FIG. 5A and FIG. 5B, one light receiving element 33 is disposed for four channels. The light receiving element 33 has a larger light receiving diameter than that of the light receiving elements 32 of the first embodiment so as to make it possible to receive optical signals of a plurality of channels.

The control unit 31 includes a frequency detector 34. The frequency detector 34 is a detector that detects a specific frequency component. For example, the frequency detector 34 is a frequency filter capable of changing a frequency component that can be transmitted. The frequency detector 34 detects a specific frequency component from the electronic signal output by the light receiving element 33 in accordance with an instruction of the control unit 31, and transmits the specific frequency component to the control unit 31. The control unit 31 monitors the optical signal (for example, optical output power) output by the light emitting element 13 of each channel on the basis of the frequency component.

Figure 6:
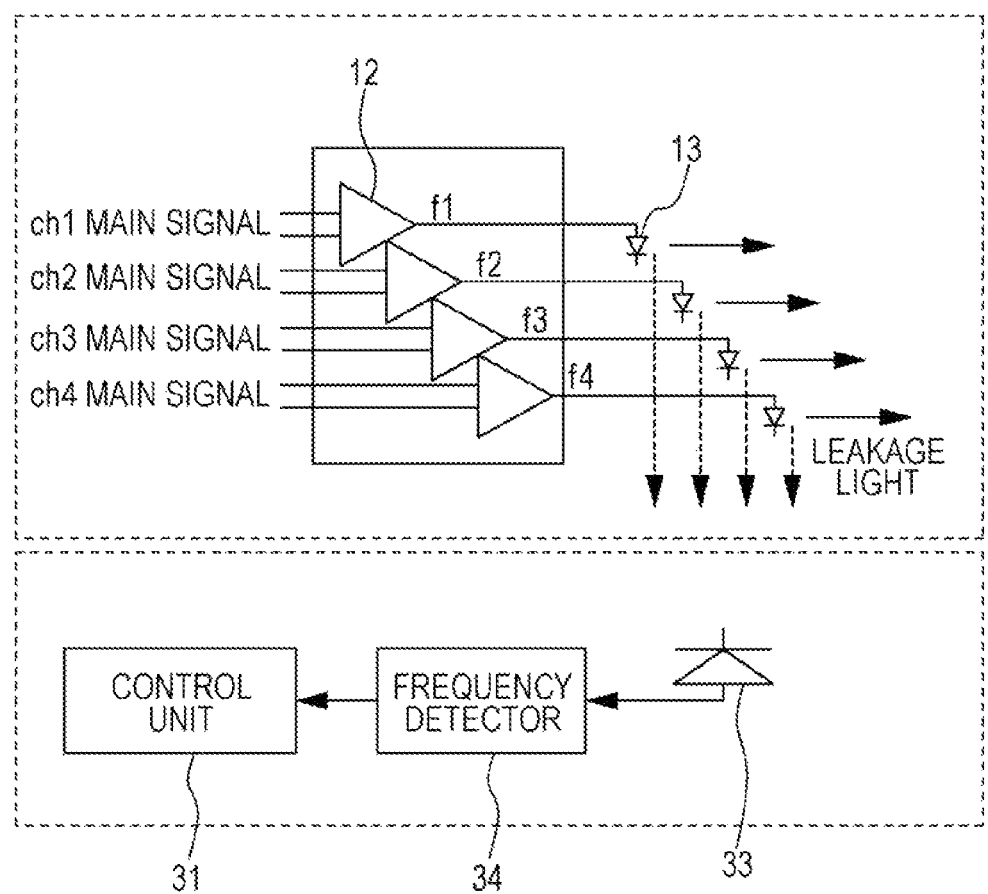
FIG. 6 is a diagram illustrating flows of an electronic signal and an optical signal.

FIG. 6 is a diagram illustrating flows of an electronic signal and an optical signal. Referring to FIG. 6, the drive circuit 12 transmits a drive signal (voltage signal, and so on) to each light emitting element 13 in accordance with each main signal of the channels 1 to 4, which is transmitted from the external device, and a control signal (a current signal, a drive amplitude, and so on) transmitted from the control unit 31. The control signal is a signal for superposing low frequency components on the output light of each light emitting element 13. Each light emitting element 13 outputs an optical signal, on which a low frequency having different one of frequencies (f1 to f4) for each channel is superposed, in accordance with the drive signal from the drive circuit 12.

The optical signal output by each light emitting element 13 is reflected by the mirror 14c, and enters the optical waveguide 14. The leakage light from the mirror 14c is received by the light receiving element 33. The light receiving element 33 transmits an electronic signal obtained by photoelectric conversion to the frequency detector 34. The frequency detector 34 detects a specific one of the frequency components (f1 to f4), and transmits the frequency component to the control unit 31. The control unit 31 may monitor the optical signal (for example, optical output power) output by the light emitting element 13 of each channel on the basis of the frequency component received from the frequency detector 34. After going through the above processes, it is possible to monitor an optical signal (for example, optical output power) for each channel. Also, the control unit 31 may transmit a monitor result to an external system.

Figure 7:
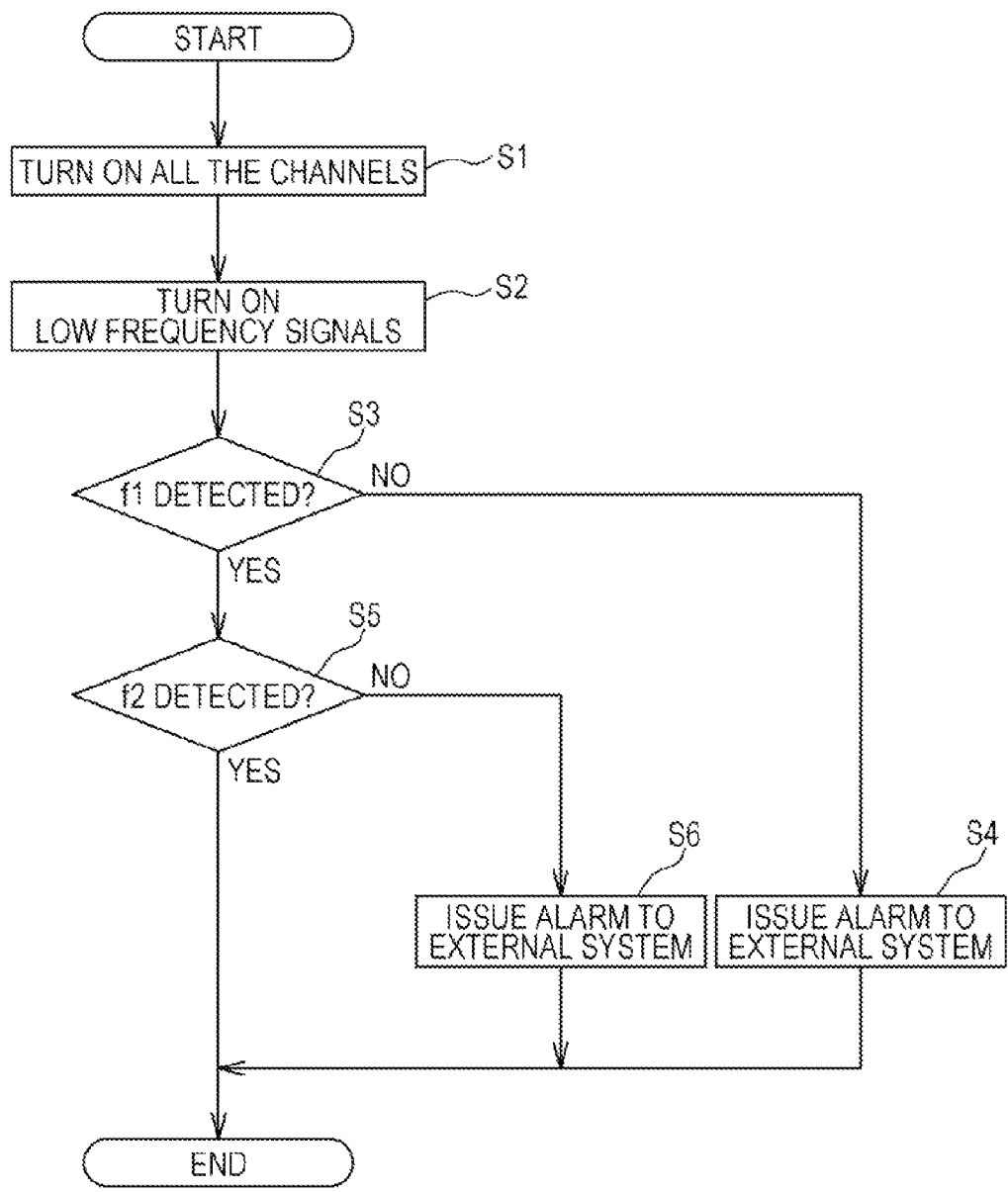
FIG. 7 is an example of a flowchart executed by a control unit at the time of monitoring an optical signal.

FIG. 7 is an example of a flowchart executed by the control unit 31 at the time of monitoring the optical signal. In this regard, in FIG. 7, for simplification of the description, the number of channels is set to two. First, the drive circuit 12 transmits a drive signal to each light emitting element 13 so as to turn on the optical output of each channel (step S1). Next, the control unit 31 superposes a low frequency component on the optical signal of each channel (step S2). Specifically, the control unit 31 superposes a low frequency component of a frequency f1 on the optical signal of channel 1, and superposes a low frequency component of a frequency f2 on the optical signal of channel 2.

Next, the control unit 31 causes the frequency detector 34 to detect the frequency component of frequency f1, and determines whether the frequency component is received by the light receiving element 33 or not (step S3). In step S3, if determined to be "No", the control unit 31 issues an alarm stating that a problem occurs in any one of the devices in channel 1 (the drive circuit 12, the light emitting element 13, and so on) to the external system (step S4). In step S3, if determined to be "Yes", the control unit 31 causes the frequency detector 34 to detect the frequency component of frequency f2, and determines whether the frequency component is received by the light receiving element 33 or not (step S5). In step S5, if determined to be "No", the control unit 31 issues an alarm stating that a problem occurs in any one of the devices in channel 2 (the drive circuit 12, the light emitting element 13, and so on) to the external system (step S6). After execution of step S4 or S6, or if determined to be "Yes" in step S5, the execution of the flowchart is terminated.

In this manner, by detecting frequency components (f1 and f2) of channel 1 and channel 2 in sequence, it is possible to determine whether a problem does not occur in the devices in each channel. In this regard, in the case where the number of channels is three or more, by detecting a frequency component of each channel, it is possible to determine whether a problem has occurred in the devices in each channel. Also, since the optical signals of a plurality of channels are commonly received by one light receiving element, interference of the optical signals among the channels, which is caused by tolerances of the electrical connector 20, misalignment of the light emitting element 13, diffusion of the output light of the light emitting element 13, and so on, does not have to be considered. Also, if a low frequency having a frequency such as not influencing the transmission of the optical signal, it is possible to monitor the optical signal of each channel during transmission of the optical signal.

In the present embodiment, the control unit 31 functions as a processing unit that performs processing to superpose individually different frequency components on the output light of the plurality of light emitting elements 13. Also, the frequency detector 34 functions as a detection unit to detect a frequency component from the electronic signal obtained by photoelectric conversion by the light receiving element 33.

In the above embodiment, in order to monitor an optical signal of each channel, a low frequency component having a different frequency for each optical signal is superposed. However, the present disclosure is not limited to this. For example, before starting the optical module 100, and so on, it is possible to monitor an optical signal of each channel by outputting the optical signal of each channel in sequence at timing not overlapping by time division multiplexing, and so on.

Figure 8:
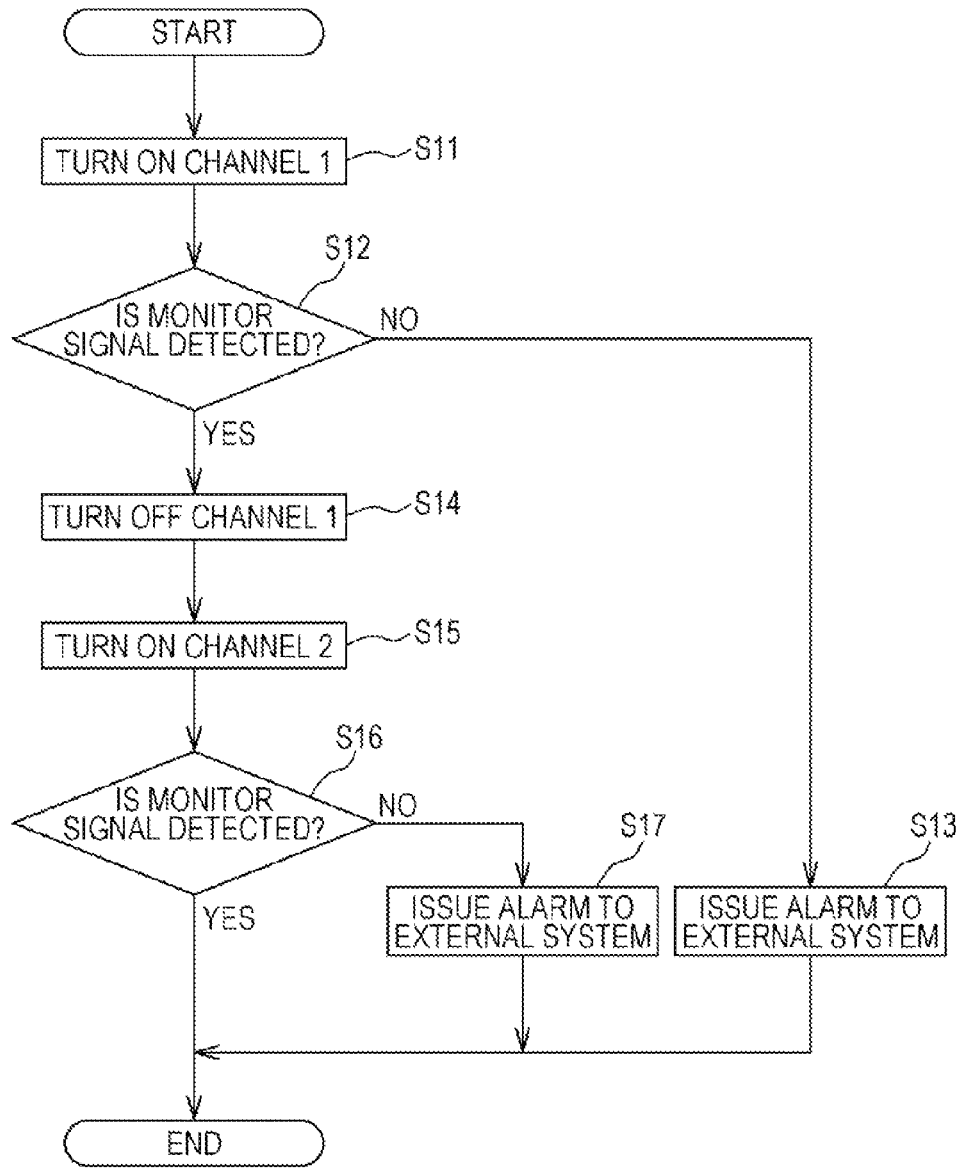
FIG. 8 is an example of a flowchart executed by a control unit at the time of monitoring an optical signal.

FIG. 8 is an example of a flowchart executed by the control unit 31 at the time of monitoring an optical signal. In this regard, in FIG. 8, for simplification of the description, the number of channels is set to two. First, the drive circuit 12 causes the light emitting element 13 of a channel 1 to output an optical signal without causing the light emitting element 13 of the channel 2 to output an optical signal (step S11). Next, the control unit 31 determines whether the light receiving element 33 is detecting an optical signal or not (step S12). In step S12, if determined to be "No", the control unit 31 issues an alarm stating that a problem occurs in any one of the devices (the drive circuit 12, the light emitting element 13, and so on) in the channel 1 to the external system (step S13).

If determined to be "Yes" in step S12, the control unit 31 causes the light emitting element 13 of the channel 1 to stop outputting an optical signal (step S14). Next, the drive circuit 12 causes the light emitting element 13 of the channel 2 to output an optical signal (step S15). Next, the control unit 31 determines whether the light receiving element 33 is detecting the optical signal or not (step S16). In step S16, if determined to be "No", the control unit 31 issues an alarm stating that a problem occurs in any one of the devices (the drive circuit 12, the light emitting element 13, and so on) in the channel 2 to the external system (step S17). After execution of step S13 or S17, or when determined to be "Yes" in step S16, the execution of the flowchart is terminated.

In this manner, by outputting the optical signals of channel 1 and channel 2 at timing not overlapping with each other in sequence, it is possible to determine whether a problem has occurred in the devices of each channel or not. In this regard, if the number of channels is three or more, it is possible to determine whether a problem has occurred in the devices of each channel or not by outputting the optical signal of each channel in sequence.

In this variation, the control unit 31 performs as a function of a processing unit that causes a plurality of light emitting elements 13 to output light in sequence at timing not overlapping with each other, and as a function of a detection unit that detects an electronic signal obtained by photoelectric conversion by the light receiving element 33.

Figure 9:
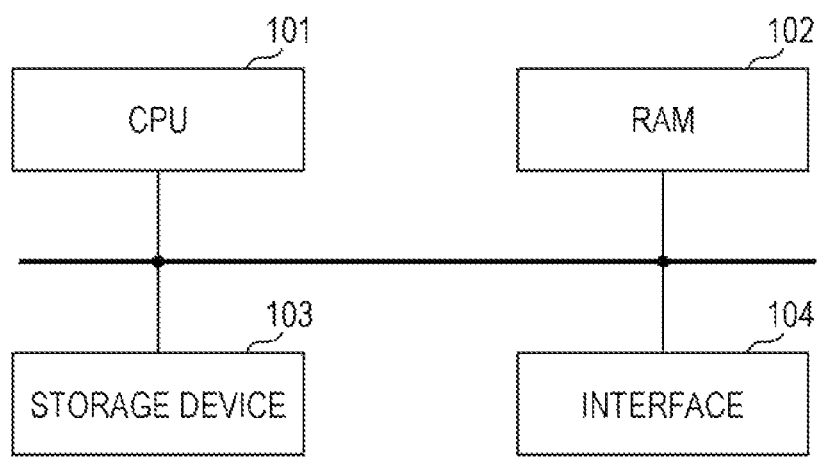
FIG. 9 is a block diagram for explaining a hardware configuration when the control unit is configured by a processing unit that executes a program.

The control unit 31 of each of the above-described embodiments may be configured by a dedicated circuit, and so on, and also may be achieved by a processing unit that executes a program. FIG. 9 is a block diagram for explaining a hardware configuration when the control unit 31 is configured by a processing unit that executes a program. Referring to FIG. 9, the control unit 31 includes a CPU 101, a RAM 102, a storage device 103, an interface 104, and so on. Each of these devices is connected through a bus, and so on. The central processing unit (CPU) 101 is a central processor. The CPU 101 includes one core or more. The random access memory (RAM) 102 is a volatile memory that temporarily stores programs executed by the CPU 101, data processed by the CPU 101, and so on. The storage device 103 is a nonvolatile storage device. For the storage device 103, it is possible to use a solid state drive (SSD), for example, a read only memory (ROM), a flash memory, and so on, and a hard disk driven by a hard disk drive, and so on. The CPU 101 executes a predetermined program so that control unit 31 is achieved in the optical module 100 or 100a.

By the above disclosure of an optical module and a method of monitoring the optical module, it provides an optical module capable of being made smaller in size.

In the above, the detailed descriptions have been given of the embodiments of the present disclosure. However, the present disclosure is not limited to a specific embodiment. It is possible to make various alternations and modifications within the spirit and scope of the appended claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical module, comprising:
   a first substrate including a first surface over which a plurality of light emitting elements are mounted;
   an optical waveguide provided with a second surface of the first substrate;
   a mirror configured to reflect output light of the light emitting element to the optical waveguide;
   a second substrate; and
   a plurality of light receiving elements configured in an opposed manner to the plurality of light emitting elements to receive leakage light of the mirror through the first substrate and the optical waveguide, the light receiving elements being mounted over the second substrate.

2. The optical module according to claim 1,
   the mirror further comprises at least one mirror corresponding to the plurality of the light emitting elements, and
   a light receiving element of the plurality of light receiving elements has a light receiving diameter configured to receive the leakage light produced when output light from the plurality of the light emitting elements is transmitted through the at least one mirror disposed in the optical waveguide.

3. The optical module according to claim 2, further comprising:
   a processing unit configured to perform processing to correspondingly superpose individually different frequency components on the output light from the plurality of the light emitting elements; and
   a detection unit configured to detect the frequency components from an electronic signal obtained by photoelectric conversion using the light receiving element.

4. The optical module according to claim 2, further comprising:
   a processing unit configured to cause the plurality of light emitting elements to output light in sequence at timing not overlapping; and
   a detection unit configured to detect an electronic signal obtained by photoelectric conversion by the light receiving element.

5. A method of monitoring an optical module including a first substrate including a first surface over which a light emitting element is mounted, an optical waveguide provided with a second surface of the first substrate, a mirror configured to reflect output light of the light emitting element to the optical waveguide, the method comprising
   receiving leakage light of the mirror through the first substrate and the optical waveguide produced when the output light from the light emitting element is transmitted through the mirror using a light receiving element provided with a second substrate provided with the second surface of the first substrate, the first substrate being different from the second substrate.

6. The method of monitoring an optical module according to claim 5,
   wherein a plurality of the light emitting elements are disposed and the mirror comprises at least one mirror corresponding to the plurality of the light emitting elements,
   the light receiving element has a light receiving diameter configured to receive the leakage light produced when output light from the plurality of the light emitting elements is transmitted through the at least one mirror,
   different frequency components are individually superposed on output light of the plurality of light emitting elements, and
   the light receiving element detects the frequency components from an electronic signal obtained by photoelectric conversion.

7. The method of monitoring an optical module according to claim 5,
   wherein a plurality of the light emitting elements are disposed;
   the light receiving element has a light receiving diameter configured to receive the leakage light produced when the output light from the plurality of the light emitting elements is transmitted through the at least one mirror;
   the plurality of the light emitting elements output light in sequence at timing not overlapping; and the light receiving element detects an electronic signal obtained by photoelectric conversion.

* * * * *